(12) United States Patent
Rahrig

(10) Patent No.: US 10,526,069 B1
(45) Date of Patent: Jan. 7, 2020

(54) COLLAPSIBLE LARGE DIAMETER PROPELLER FOR QUIET AIRCRAFT

(71) Applicant: Northrop Grumman Systems Corporation, Falls Church, VA (US)

(72) Inventor: Kyle M. Rahrig, El Segundo, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 634 days.

(21) Appl. No.: 15/259,193

(22) Filed: Sep. 8, 2016

(51) Int. Cl.
| | |
|---|---|
| B64C 11/46 | (2006.01) |
| B64C 11/28 | (2006.01) |
| B64D 27/24 | (2006.01) |
| B64C 11/48 | (2006.01) |
| B64D 27/02 | (2006.01) |

(52) U.S. Cl.
CPC .............. B64C 11/46 (2013.01); B64C 11/28 (2013.01); B64C 11/48 (2013.01); B64D 27/24 (2013.01); B64D 2027/026 (2013.01)

(58) Field of Classification Search
CPC ......... B64C 11/28; B64C 11/46; B64C 11/48; B64D 2027/026
See application file for complete search history.

(56) References Cited

U.S. PATENT DOCUMENTS

| | | | |
|---|---|---|---|
| 2,330,803 A | 10/1943 | Andrews | |
| 3,023,813 A * | 3/1962 | Fengler | B63H 5/10 |
| | | | 416/124 |
| 3,773,433 A | 11/1973 | Hollrock | |
| 3,811,642 A | 5/1974 | Prather | |
| 4,427,341 A | 1/1984 | Eichler | |
| 4,801,243 A | 1/1989 | Norton | |
| 4,936,526 A | 6/1990 | Gries | |
| 4,979,876 A * | 12/1990 | Chapman | B64C 11/28 |
| | | | 244/3.29 |
| 5,343,823 A | 9/1994 | Blaha | |

(Continued)

OTHER PUBLICATIONS

Lee, Y. T. et al; An Alternative Propulsion Concept for Small Underwater Vehicle Applications; ASNE Day 2011, "Thinking Outside the Hull", Feb. 10-11, 2011 https://www.member.navalengineers.org/SiteCollectionDocuments/2011%20Proceedings%20Documents/ASNE%20Day%202011/Papers/Lee.pdf.

(Continued)

*Primary Examiner* — Philip J Bonzell
*Assistant Examiner* — Michael B. Kreiner
(74) *Attorney, Agent, or Firm* — McCracken & Gillen LLC

(57) ABSTRACT

An aircraft has a small high-speed propeller used during take-off, climbing and landing maneuvers, and a large collapsible or foldable propeller used for loitering. The large collapsible or foldable propeller is kept in a folded configuration during take-offs and landings to minimize drag and to avoid ground strikes. During loitering operations, the large collapsible propeller is unfolded and used at a lower rotational speed than the smaller high-speed propeller to permit efficient and quite loitering. During loitering operations, the smaller high-speed propeller may be disengaged so as to spin freely or held in a non-rotational position. One or more foldable propellers may be paired with at least one conventional propeller. The propellers may be arranged as twin tractor, tractor-pusher, or nearly any other type of layout on the fuselage or wings, or on pods of the fuselage or wings.

12 Claims, 3 Drawing Sheets

(56) References Cited

U.S. PATENT DOCUMENTS

| | | | |
|---|---|---|---|
| 6,559,370 B1 | 5/2003 | Barker | |
| 7,090,550 B2 | 8/2006 | Wilkie | |
| 10,407,163 B2* | 9/2019 | Henze | B64C 19/00 |
| 2012/0292456 A1 | 11/2012 | Hollimon et al. | |
| 2013/0174533 A1* | 7/2013 | Ribarov | B64C 11/48 60/226.1 |
| 2014/0010652 A1* | 1/2014 | Suntharalingam | B64D 27/02 416/1 |
| 2014/0250861 A1* | 9/2014 | Eames | F02C 9/44 60/204 |
| 2015/0078888 A1* | 3/2015 | Golshany | F02C 7/36 415/123 |
| 2016/0023773 A1* | 1/2016 | Himmelmann | B64D 27/10 60/778 |
| 2016/0318600 A1* | 11/2016 | Wirasnik | B64C 11/28 |
| 2016/0378120 A1* | 12/2016 | Creasman | B64C 3/546 701/2 |
| 2017/0274993 A1* | 9/2017 | Beckman | B64C 39/024 |
| 2018/0044029 A1* | 2/2018 | Koegler | B64D 27/24 |
| 2018/0281979 A1* | 10/2018 | Reigner | B64C 11/48 |
| 2019/0071174 A1* | 3/2019 | Burigo | B64C 29/0016 |

OTHER PUBLICATIONS

Barbarino; S. et al; A review of morphing aircraft; Journal of Intelligent Material Systems and Structures 22, No. 9 (2011): 823-877; See variable diameter rotor (VDTR) on p. 835.

Tai, Jimmy C. et al; A Comparative Assessment of High-Speed Rotorcraft Concepts (HSRC): Reaction Driven Stopped Rotor/Wing Versus Variable Diameter Tiltrotor; No. 975548; SAE Technical Paper; 1997.

Brender, S. et al; The Attributes of a Variable-Diameter Rotor System Applied to Civil Tiltrotor Aircraft; Jan. 1, 1996; NASA University Consortium Grant NCC2-5174; NASA-CR-203092.

Germanowski, P.J. et al; Technology assessment for large vertical-lift transport tiltrotors; National Aeronautics and Space Administration, Ames Research Center, 2010; NASA/CR-2010-216384; May 2010.

\* cited by examiner

COLLAPSIBLE LARGE DIAMETER PROPELLER FOR QUIET AIRCRAFT

TECHNICAL FIELD

The invention relates generally to spectrometers and in particular, an integrated imaging multispectral imager.

An embodiment of the present invention relates to the field of aircraft, more particularly, to the field of aircraft propulsion.

BACKGROUND

In the past, aircraft used small diameter high-speed propellers for all modes of flight operations. This included take-off, climbing, landing maneuvers as well as loitering. The small diameter propeller spins at a high speed to provide sufficient propulsion. Spinning at a high speed is noisy. Therefore, in applications where it is desirable for quiet aircraft operations during loitering operations, a small diameter propeller is undesirable. Unfortunately, using a larger diameter slower-speed propeller to perform quieter during loitering operations will result in insufficient propulsion during take-off, climbing and landing, and in addition, the larger diameter propeller is likely to strike the ground during takeoff and landing.

SUMMARY

An embodiment of the present invention comprises an aircraft with a small high-speed propeller used during take-off, climbing and landing maneuvers, and a large collapsible or foldable propeller used for loitering. The large collapsible or foldable propeller is kept in a folded configuration during take-offs and landings to minimize drag and to avoid ground strikes. During loitering operations, the large collapsible propeller is unfolded and used at a lower rotational speed than the smaller high-speed propeller to permit efficient and quite loitering. During loitering operations, the smaller high-speed propeller may be disengaged so as to spin freely or held in a non-rotational position. One or more foldable propellers may be paired with at least one conventional propeller. The propellers may be arranged as twin tractor, twin pusher, tractor-pusher, or nearly any other type of layout on the fuselage or wings, or on pods of the fuselage or wings.

In another embodiment of the present invention, an aircraft comprises a fuselage, a first smaller propeller having a first rotational axis, and a second larger propeller having folding blades and a second rotational axis. The first rotational axis and the second rotational axis are substantially parallel, and the first and second propellers are mounted to the fuselage. The blades of the first propeller may be folding or non-folding.

In yet another embodiment of the present invention, an aircraft comprises a fuselage, a wing, a first smaller propeller having a first rotational axis, and a second larger propeller having folding blades and a second rotational axis. The first rotational axis and the second rotational axis are substantially parallel, and at least one of the first and second propellers are mounted to the wing. The blades of the first propeller may be folding or non-folding.

In another embodiment of the present invention, an aircraft comprises a first smaller propeller having a first rotational axis, and a second larger propeller having folding blades and a second rotational axis. The first rotational axis and the second rotational axis are substantially parallel.

In still another embodiment of the present invention, an aircraft comprises a first smaller propeller having a first rotational axis, and a second larger propeller having folding blades and a second rotational axis. The first propeller and the second propeller are connected to a common rotating shaft, and the blades of the first propeller may be folding or non-folding.

In yet another embodiment of the present invention, an aircraft comprises a first smaller propeller having a first rotational axis, and a second larger propeller having folding blades and a second rotational axis. The first propeller is connected to a first rotating member and the second propeller is connected to a second rotating member, and the first and the second rotating members are concentric. The blades of the first propeller may be folding or non-folding.

DETAILED DESCRIPTION

Figure 1:
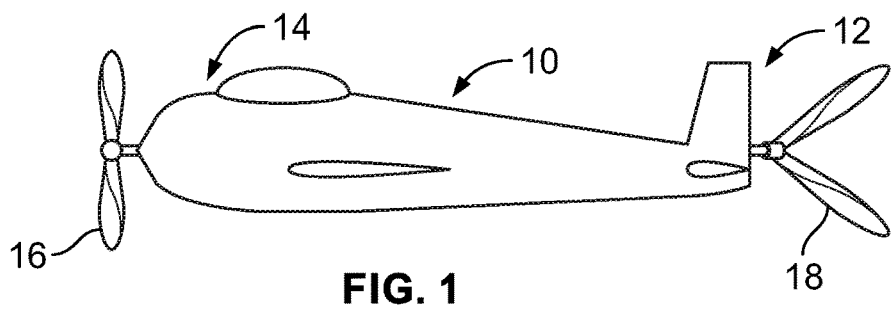
FIGS. 1, 2, 3 and 4 illustrate an aircraft with a non-folding smaller propeller and a folding larger propeller mounted to the fuselage.

FIG. 1 illustrates aircraft 10 with tail section 12 and nose section 14. Propeller 16 has non-folding blades and is mounted near nose portion 14. It is also possible for propeller 16 to have folding blades. Propeller 18 has folding blades and is illustrated in a folded position. The rotational axes of propellers 16 and 18 are substantially co-linear. It should be noted that in this embodiment, the blades of propeller 18 are folded in a direction away from the aircraft. It is also possible for the blades of folding propeller 18 to fold in a direction toward aircraft 10. It should also be noted that propeller 16 is smaller than propeller 18.

Figure 2:
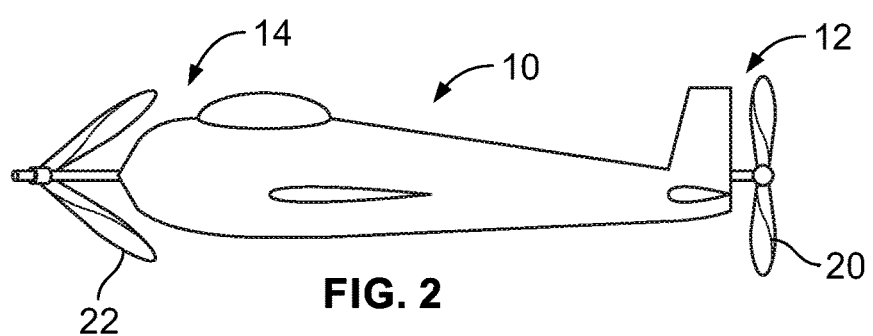

FIG. 2 illustrates aircraft 10 with propeller 20 mounted near rear portion 12 and propeller 22 mounted near nose portion 14. Propeller 20 has non-folding blades and propeller 22 has folding blades. The folding blades of propeller 22 are illustrated folded in a direction toward aircraft 10. It is also possible for the folding blades of propeller 22 to fold in the direction away from aircraft 10. Additionally, it is also possible for propeller 20 to have folding blades. It should also be noted that propeller 20 is smaller than propeller 22.

Figure 3:
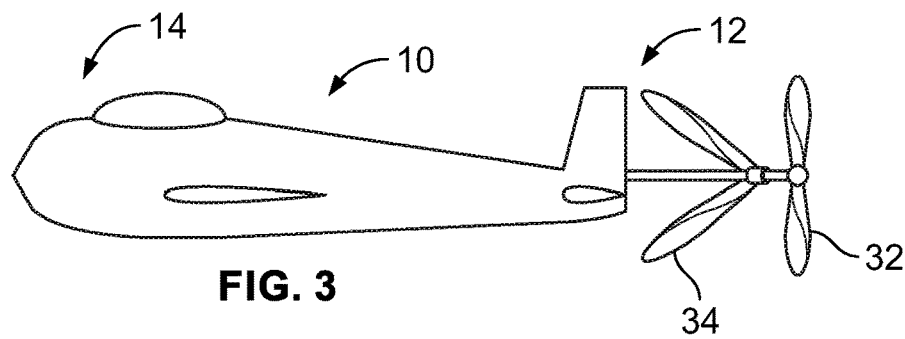

FIG. 3 illustrates aircraft 10 with propellers 32 and 34 mounted near tail portion 12. In this embodiment, folding propeller 34 is mounted closer to the aircraft then non-folding propeller 32. It is also possible to mount non-folding propeller 32 closer to the aircraft 10 with folding propeller 34 further away from aircraft 10. Should also be noted that in this embodiment folding propeller 34 is folded in a direction toward aircraft 10. Propellers 32 and 34 may be mounted to a common rotating shaft or separate concentric rotating members. Additionally, it is also possible for propeller 32 to have folding blades. It should also be noted that propeller 32 is smaller than propeller 34.

Figure 4:
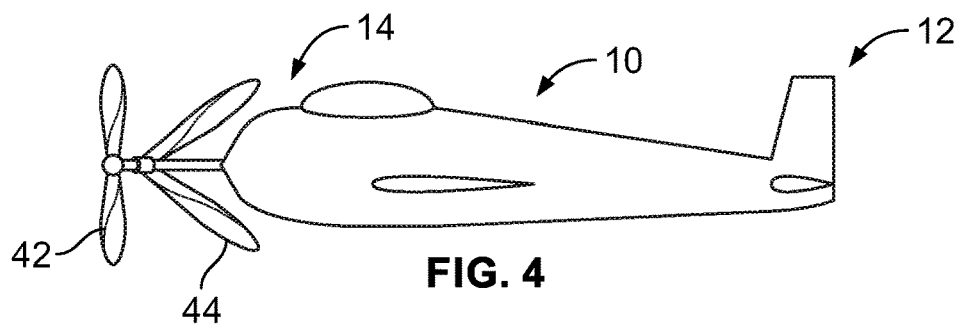

FIG. 4 illustrates aircraft 10 with propellers 42 and 44 mounted near nose portion 14. In this embodiment, folding propeller 44 is mounted closer to aircraft 10. It is also possible to mount non-folding propeller 42 closer to the aircraft 10 with folding propeller 44 further away from aircraft 10. FIG. 4 illustrates folding propeller 44 folded in the direction toward aircraft 10; however, is also possible to fold folding propeller 44 in a direction away from aircraft 10. Propellers 42 and 44 may be mounted to a common rotating shaft or separate concentric rotating members. Additionally, it is also possible for propeller 42 to have folding blades. It should also be noted that propeller 42 is smaller than propeller 44.

Figure 5:
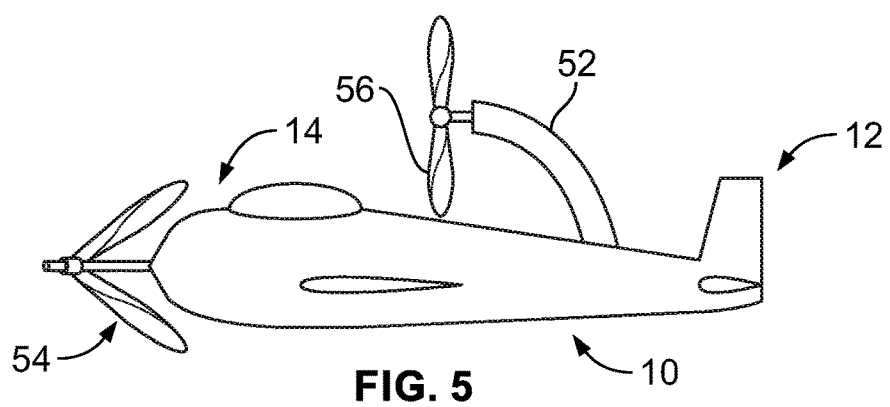
FIG. 5 illustrates an aircraft with a non-folding smaller propeller mounted to a fuselage pod and a folding larger propeller mounted to the nose area of the fuselage.

FIG. 5 illustrates aircraft 10 with fuselage pod 52. In this embodiment, folding propeller 54 is mounted near nose portion 14 and non-folding propeller 56 is mounted to fuselage pod 52. Should be noted that folding propeller 54 may also be mounted near tail portion 12. Folding propeller 54 may be folded in the direction toward or away from aircraft 10. It is also possible to mount folding propeller 54 on fuselage pod 52 so that folding propeller 54 does not strike the fuselage when deployed in an unfolded configuration. Additionally, it is also possible for propeller 56 to have folding blades. It should also be noted that propeller 56 is smaller than propeller 54. Pod 52 and propeller 56 may be arranged in a tractor configuration as shown in FIG. 5, however, it is also possible to arrange them in a pusher configuration by mounting pod 52 and propeller 56 in a position rotated 180 degrees relative to the position shown in FIG. 5.

Figure 6:
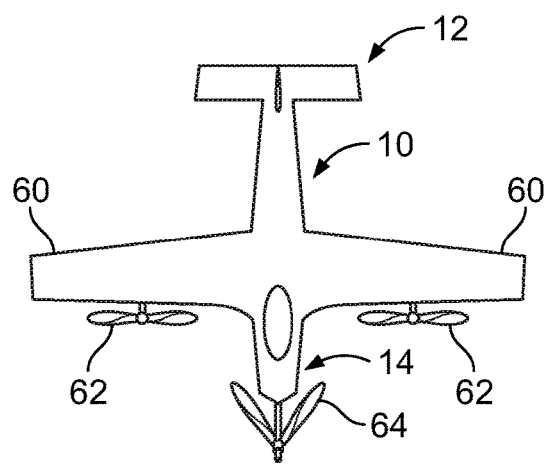
FIG. 6 illustrates an aircraft with non-folding smaller propellers mounted to the wings and a folding larger propeller mount to the nose area of the fuselage.

FIG. 6 illustrates aircraft 10 with wings 60. Non-folding propellers 62 are amounted to wings 60 and folding propeller 64 is mounted near nose section 14. Folding propeller 64 is illustrated in a folded configuration toward aircraft 10. Is also possible for the folded configuration to be in a direction away from aircraft 10. Additionally, folding propeller 64 may be mounted near tail portion 12. The rotational axes of propellers 62 and 64 are substantially parallel. Additionally, it is also possible for propeller 62 to have folding blades. It should also be noted that propellers 62 are smaller than propeller 64. It is also possible to mount propellers 62 near the trailing edge of wings 60.

Figure 7:
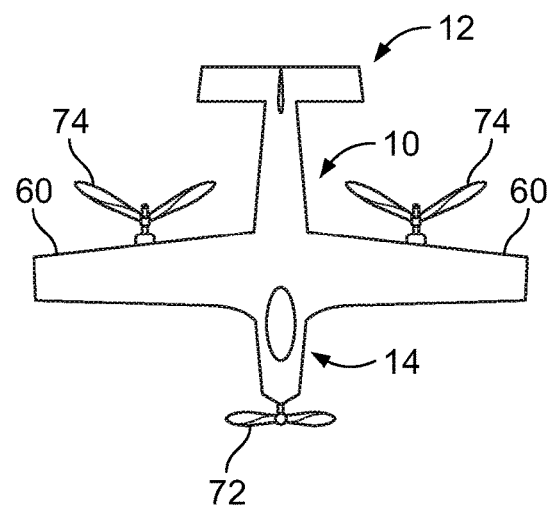
FIG. 7 illustrates an aircraft with folding larger propellers mounted to the wings and the non-folding smaller propeller mounted to the nose area of the fuselage.

FIG. 7 illustrates aircraft 10 with non-folding propeller 72 mounted near nose portion 14. It is also possible to mount non-folding propeller 72 near tail portion 12. Folding propellers 74 are mounted to wings 60. Folding propeller 74 may be mounted near the leading or trailing sections of wing 60. Folding propels 74 maybe facing away from or toward wings 60 when in a folded configuration. Additionally, it is also possible for propeller 72 to have folding blades. It should also be noted that propeller 72 is smaller than propellers 74.

Figure 8:
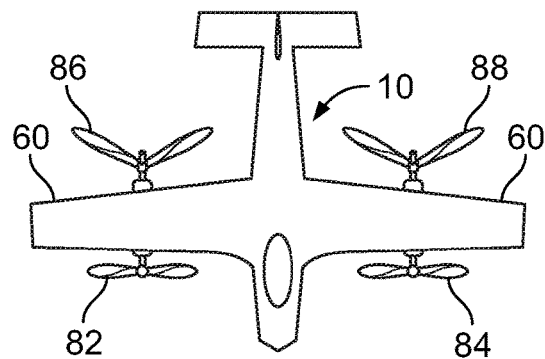
FIG. 8 illustrates an aircraft with wing-mounted propellers where the folding and non-folding propellers rotational axes are substantially co-linear.

FIG. 8 illustrates aircraft 10 with non-folding propellers 82 and 84 mounted to wings 60, and folding propellers 86 and 88 mounted to wings 60. In this embodiment, the non-folding propellers are mounted near the leading edge of wing 60 and the folding propellers are mounted near the trailing edge of wings 60. Is also possible to mount the non-folding propellers near the trailing edge of wing 60 and the folding propellers near the leading edge of wing 60. Folding propellers 86 and 88 maybe folded in the direction toward or away from wings 60. It should be noted that the rotational axes of propellers 82, 84, 86 and 88 are substantially parallel. In this particular embodiment, the rotational axes of propellers 82 and 86 are substantially co-linear while the rotational axes of propellers 84 and 88 a substantially collinear. Additionally, it is also possible for propellers 82 and 84 to have folding blades. It should also be noted that propellers 82 and 84 are smaller than propellers 86 and 88.

Figure 9:
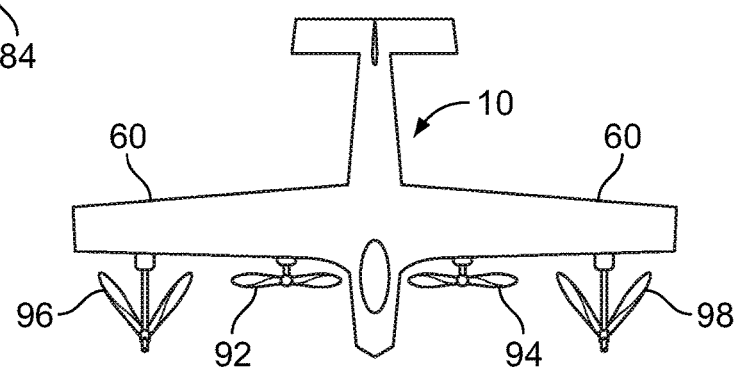
FIG. 9 illustrates an aircraft with wing-mounted propellers with a folding and non-folding propellers have substantially parallel rotational axes.

FIG. 9 illustrates aircraft 10 with non-folding propellers 92 and 94 mounted near the leading edge of wings 60, and folding propellers 96 and 98 also mounted near the leading edge of wings 60. The rotational axes of all four propellers are substantially parallel. Is also possible to mount propellers 92, 94, 96 and 98 near the trailing edge of wings 60. When in a folded configuration, folding propellers 96 and 98 maybe folded the direction away from or toward wings 60. Additionally, it is also possible for propellers 92 and 94 to have folding blades. It should also be noted that propellers 92 and 94 are smaller than propellers 96 and 98.

Figure 10:
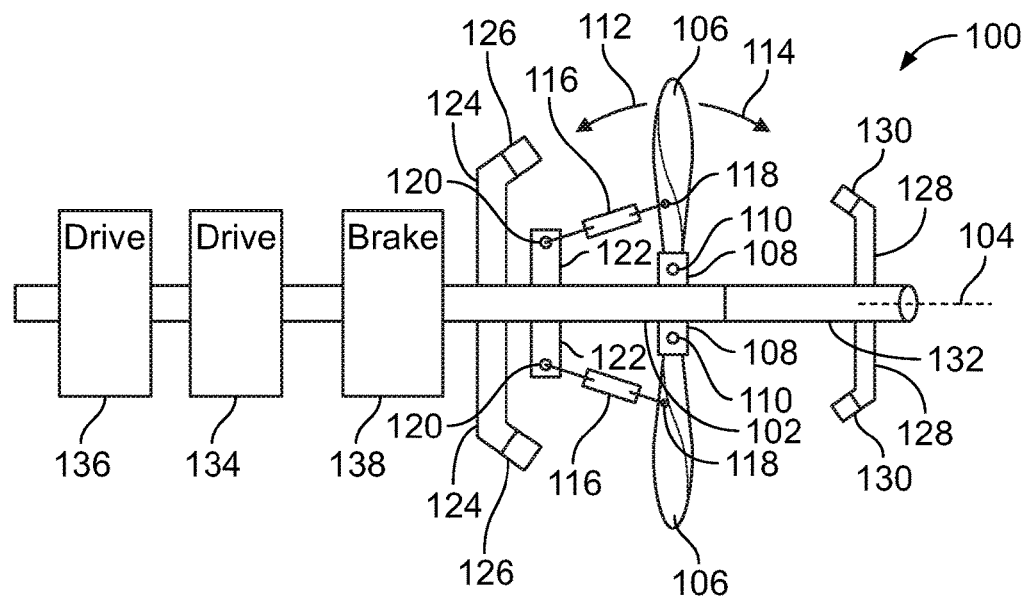
FIG. 10 illustrates a folding propeller with multiple propeller drives.

FIG. 10 illustrates folding propeller 100. Folding propeller 100 is attached to rotating shaft 102. Rotating shaft 102 rotates about rotating axis 104. Folding propeller 100 includes folding blades 106. The figure illustrates only two blades for simplicity; however more or less blades may be used. Blades 106 are mounted to rotational shaft 102 using support members 108. Support members 108 and blades 106 are attached through pivot pin 110. Blades 106 are illustrated in an unfolded configuration. Blades 106 are moved in the direction of arrows 112 or 114 to place folding propeller 100 in a folded configuration. Blades 106 are moved in the direction of arrows 112 or 114 using actuators 116. Actuators 116 may be, for example, pneumatically or electrically operated. Actuators 116 are connected to blades 106 by pivot pins 118. Actuators 116 are secured to rotating shaft 102 by pivot pins 120 in support members 122. When blades 106 are folded in the direction of arrow 112, blades 106 are secured in the folded configuration by support members 124. Support members 124 include clamps 126 which grasp and hold blades 106 when in the folder configuration. Clamps 126 may be operated for example, by pneumatic or electrical actuation. If blades 106 are folded in the direction of arrow 114, blades 106 are secured in the folded configuration by support members 128. Support members 128 include clamps 130 which grasp and hold blades 106 when in the folded configuration. Clamps 130 may be operated for example by pneumatic or electrical means. Support members 128 amounted to rotating member 102 by rotating member extension 132.

Rotating member 102 may be rotated by drive 134 or drive 136. Drive 134 may be directly connected to rotating member 102 or it may be connected using a transmission system such as gears, pulleys or fluids. Drive 136 may be directly connected to rotating member 102 or it may be connected using a transmission system such as gears, pulleys or fluids. Drives 134 and 136 may be for example, electric motors or internal combustion engines. Drives 134 and 136 may be the same type or different types of drive. For example, drive 134 may be an internal combustion engine while drive 136 may be an electric motor. Break 138 maybe used to stop the rotation of rotating member 102, for example, in embodiments where folding propeller 100 may strike other structures if rotated in a folded configuration. In embodiments where the folded propeller will not strike other structures, it is also possible to let the folded propeller spin freely.

Figure 11:
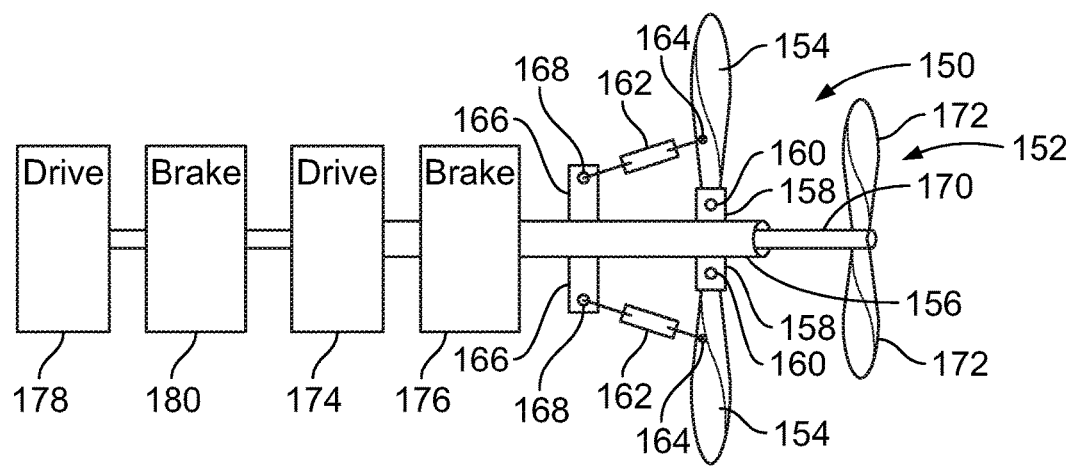
FIG. 11 illustrates a folding propeller and a non-folding propeller with concentric rotational members.

FIG. 11 illustrates folding propeller 150 and non-folding or smaller propeller 152 arranged with concentric rotating members. It is also possible for propeller 152 to have folding blades. Blades 154 of folding propeller 150 are mounted to rotating member 156 using supports 158 and pivot pins 160. Actuators 162 are used to move blades 154 between a folded and unfolded configuration. Actuators 162 are connected to blades 154 by pivot pins 164, and actuators 162 amounted to rotating member 156 by support members 166 and pivot pins 168. Rotating member 156 may be cylindrical with a hollow center that allows rotating member 170 to pass through the center of rotating member 156. Blades 172 of propeller 152 are mounted to rotating member 170. Rotating member 156 is rotated by propeller drive 174. Propeller Drive 174 may be for example, an internal combustion engine or electric motor. The rotation of rotating member 156 maybe stopped by break 176. Rotating member 170 may be rotated by propeller drive 178. Propeller Drive 178 may be for example, an internal combustion engine or an electric motor. The rotation of rotating member 170 maybe stopped by break 180. It should be noted that drives 178 and 174 may rotate their associated rotating member in the same direction or different directions. Each of drives 174 and 178 may be directly connected to their associated rotating member or they may be connected using a transmission system such as a system of gears, pulleys or fluids.

Drives 174 and 178 may be used at different times. For example, drive 178 may be an internal combustion engine used to drive smaller propeller 152 at a high rate of rotation during aircraft take off, climbs and landings. During loitering flight, actuators 162 may be used to move blades 154 to place propeller 150 in an unfolded configuration, drive 178 may be stopped and break 180 may be used to stop the rotation of propeller 152, and drive 174 may be used to rotate propeller 150 at a lower rate of revolution than the rotation rate used to rotate propeller 152. Drive 174 may be an electric motor to decrease the noise created by the aircraft while loitering. When preparing to land or perform maneuvers that require high levels of propulsion for the aircraft, drive 174 may be stopped and the rotation of shaft 156 may be stopped using brake 176. Actuators 162 may then be used to move blades 152 so as to place propeller 150 in a folder configuration, and once again, drive 178 may be used to rotate propeller 152.

Figure 12:
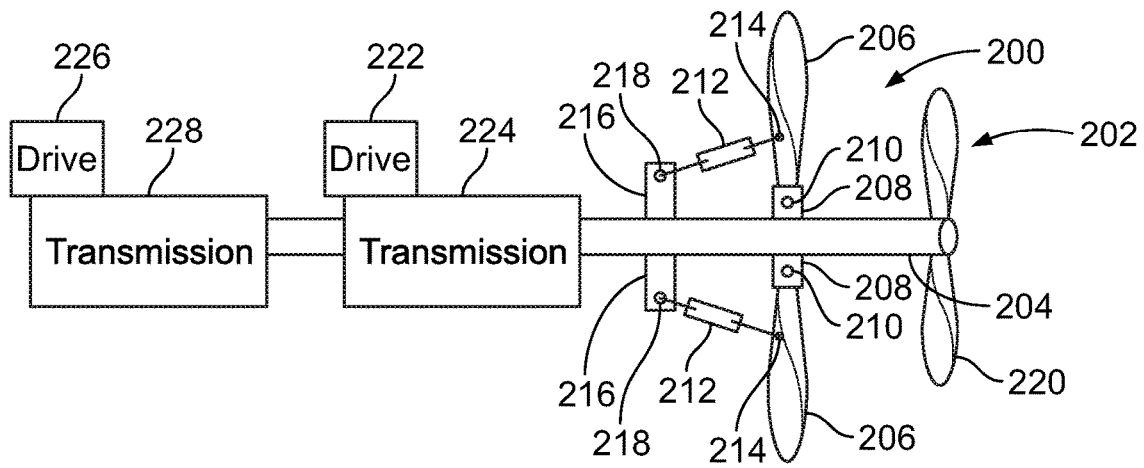
FIG. 12 illustrates a folding propeller and non-folding propeller sharing the same rotational shaft.

FIG. 12 illustrates folding propeller 200 and non-folding or smaller propeller 202 where both are mounted to a common rotating shaft 204. It is also possible for propeller 202 to have folding blades. Blades 206 of folding propeller 200 are mounted to shaft 204 using support members 208 and pivot pins 210. Blades 206 are moved between a folded and unfolded configuration by actuators 212. Actuators 212 are connected to blades 206 by pivot pins 214. Actuators 212 are mounted to shaft 204 using support members 216 and pivot pins 218. Blades 220 of propeller 202 are connected to shaft 204 in a conventional fashion. Shaft 204 may be rotated by propeller drive 222 directly or by using transmission system 224. Transmission system 224 may be a system such as a system of gears, pulleys or fluids. Shaft 204 may also be rotated by propeller drive 226 directly or through transmission system 228. Transmission system 228 may be a system such as a system of gears, pulleys or fluids. Drive 222 may be for example, an internal combustion engine or electric motor. Similarly, Drive 226 may be for example, an internal combustion engine an electric motor. Drives 222 and 226 maybe the same type of drive or different types of drive. For example, drive 222 may be an internal combustion drive and drive 226 maybe an electric motor, which reduces sound during loitering flight.

Drives 222 and 226 may be used at different times. For example, drive 222 may be used to rotate shaft 204 at a high rate of rotation during aircraft take off, climbs and landings. During loitering flight, actuators 212 may be used to move blades 206 to place propeller 200 in an unfolded configuration, drive 224 may be stopped and drive 226 may be used to rotate shaft 204 at a lower rate of revolution than the rotation rate provided by drive 222. When preparing to land or perform maneuvers that require high levels of propulsion for the aircraft, drive 226 may be stopped, actuators 212 may then be used to move blades 206 so as to place propeller 200 in a folder configuration, and drive 222 may be used to rotate shaft 204 at a high rate of rotation.

What is claimed is:

1. An aircraft, comprising:
a first smaller propeller having a first rotational axis;
a second larger propeller having folding blades and a second rotational axis, wherein the first rotational axis and the second rotational axis are substantially co-linear;
a first propeller drive connected to the first smaller propeller, the first propeller drive causing the first smaller propeller to rotate; and
a second propeller drive connected to the second larger propeller, the second propeller drive causing the second larger propeller to rotate;
wherein the first smaller propeller and the second larger propeller rotate in a same direction; and
wherein one of the first and the second propeller drives is an internal combustion drive and the other of the first and the second propeller drives is an electric drive.

2. The aircraft of claim 1, wherein the first smaller propeller and the second larger propeller rotate in a same direction.

3. The aircraft of claim 1, wherein the first smaller propeller and the second larger propeller are connected to a common rotating shaft.

4. The aircraft of claim 3, further comprising:
a first propeller drive connected to the common rotating shaft, the first propeller drive causing the common rotating shaft to rotate when the second larger propeller is in a folded configuration; and
a second propeller drive connected to the common rotating shaft, the second propeller drive causing the common rotating shaft to rotate when the second larger propeller is in an unfolded configuration.

5. The aircraft of claim 1, wherein the first smaller propeller is connected to a first rotating member and the second larger propeller is connected to a second rotating member, wherein the first and the second rotating members are concentric.

6. The aircraft of claim 5, wherein the first smaller propeller and second larger propeller rotate in a same direction.

7. The aircraft of claim 5, further comprising:
a first propeller drive connected to the first rotating member, the first propeller causing drive causing the first rotating member to rotate; and
a second propeller drive connected to the second rotating member, the second propeller drive causing the second rotating member to rotate.

8. An aircraft, comprising:
a fuselage;

a first smaller propeller having a first rotational axis; and a second larger propeller having folding blades and a second rotational axis, wherein the first rotational axis and the second rotational axis are substantially parallel, and wherein the first smaller propeller and the second larger propeller are mounted to the fuselage.

9. The aircraft of claim 8, wherein the second larger propeller is positioned at a nose portion of the fuselage.

10. The aircraft of claim 8, wherein the second larger propeller is positioned at a tail portion of the fuselage.

11. The aircraft of claim 8, wherein the first smaller propeller is positioned at a pod portion of the fuselage.

12. An aircraft, comprising:

a fuselage;

a wing;

a first smaller propeller having a first rotational axis; and a second larger propeller having folding blades and a second rotational axis, wherein the first rotational axis and the second rotational axis are substantially co-linear, and wherein the first smaller propeller and the second larger propeller are mounted to the wing.

* * * * *